US012584498B2

(12) United States Patent
Chiu et al.

(10) Patent No.: US 12,584,498 B2
(45) Date of Patent: Mar. 24, 2026

(54) FAN

(71) Applicant: Delta Electronics, Inc., Taoyuan City (TW)

(72) Inventors: Pei-Han Chiu, Taoyuan City (TW); Chien-Ming Lee, Taoyuan City (TW); Chung-Yuan Tsang, Taoyuan City (TW)

(73) Assignee: Delta Electronics, Inc., Taoyuan City (TW)

( * ) Notice: Subject to any disclaimer, the term of this patent is extended or adjusted under 35 U.S.C. 154(b) by 0 days.

(21) Appl. No.: 18/377,559

(22) Filed: Oct. 6, 2023

(65) Prior Publication Data

US 2024/0040740 A1 Feb. 1, 2024

Related U.S. Application Data

(63) Continuation-in-part of application No. 17/680,052, filed on Feb. 24, 2022, now abandoned.

(Continued)

(30) Foreign Application Priority Data

Feb. 11, 2022 (CN) .......................... 202210128548.9
May 17, 2023 (CN) .......................... 202321185647.7

(51) Int. Cl.
 *F04D 29/58* (2006.01)
 *F04D 17/06* (2006.01)
 (Continued)

(52) U.S. Cl.
 CPC ......... *F04D 29/5813* (2013.01); *F04D 17/06* (2013.01); *F04D 25/082* (2013.01);
 (Continued)

(58) Field of Classification Search
 CPC .... F04D 29/326; F04D 29/325; F04D 29/667; F04D 29/5806; F04D 17/06;
 (Continued)

(56) References Cited

U.S. PATENT DOCUMENTS 3,303,995 A * 2/1967 Boeckel ................... F24F 7/007
 417/423.15
4,566,852 A 1/1986 Hauser
 (Continued)

FOREIGN PATENT DOCUMENTS

CN 100374734 C 3/2008
CN 101218435 A 7/2008
 (Continued)

OTHER PUBLICATIONS

Parallel Curves. Sep. 12, 2025. https://en.wikipedia.org/wiki/Parallel_curve.

*Primary Examiner* — Michael K. Reitz
(74) *Attorney, Agent, or Firm* — KIRTON McCONKIE; Evan R. Witt

(57) ABSTRACT

A fan includes a frame, an impeller, a driving assembly and a circuit board. The frame includes an inlet, an outlet, a first accommodation space, a base and a second accommodation space, wherein the inlet and the outlet are disposed at opposite sides of the frame, and the first accommodation space is separated from the second accommodation space. The impeller is disposed in the first accommodation space and on the base. The driving assembly is disposed between the base and the impeller. The circuit board is disposed in the second accommodation space. The base includes plural first through holes, and the impeller includes plural second through holes. During the fan is operating, a first airflow is formed to flow from the inlet to the outlet, and a second airflow is formed to flow through the driving assembly via (Continued)

1a the plural first through holes and the plural second through holes.

23 Claims, 17 Drawing Sheets

Related U.S. Application Data

(60) Provisional application No. 63/153,868, filed on Jul. 29, 2021.

(51) Int. Cl.

| | |
|---|---|
| *F04D 25/08* | (2006.01) |
| *F04D 27/00* | (2006.01) |
| *F04D 27/02* | (2006.01) |
| *F04D 29/32* | (2006.01) |
| *H02K 5/22* | (2006.01) |

(52) U.S. Cl.
CPC ....... *F04D 27/009* (2013.01); *F04D 27/0207* (2013.01); *F04D 29/326* (2013.01); *F04D 29/5806* (2013.01); *H02K 5/225* (2013.01)

(58) Field of Classification Search
CPC .. F04D 27/009; F04D 27/0207; F04D 25/082; H02K 5/225
See application file for complete search history.

(56) References Cited

U.S. PATENT DOCUMENTS

| | | | |
|---|---|---|---|
| 5,352,089 A | 10/1994 | Tokunaga et al. | |
| 5,695,318 A | 12/1997 | Harmsen | |
| 5,743,710 A | 4/1998 | Yapp | |
| 5,813,831 A | 9/1998 | Matsunaga et al. | |
| 6,830,440 B1 * | 12/2004 | Riddoch | H02K 11/33 |
| | | | 417/353 |

| | | | |
|---|---|---|---|
| 8,029,251 B2 | 10/2011 | Oguma | |
| 9,103,347 B2 * | 8/2015 | Yu | H02K 5/04 |
| 9,404,502 B2 | 8/2016 | Ishikawa | |
| 10,711,992 B2 | 7/2020 | Fan | |
| 11,092,162 B2 | 8/2021 | Ishii et al. | |
| 11,732,728 B2 | 8/2023 | Gebert et al. | |
| 2010/0111667 A1 | 5/2010 | Stagg et al. | |
| 2012/0020778 A1 | 1/2012 | Ruck | |
| 2012/0219419 A1 | 8/2012 | Liu | |
| 2013/0149122 A1 * | 6/2013 | Yeh | F04D 25/068 |
| | | | 415/183 |
| 2013/0236303 A1 | 9/2013 | Teramoto et al. | |
| 2013/0323096 A1 * | 12/2013 | Mueller | F04D 25/082 |
| | | | 417/368 |
| 2015/0176594 A1 | 6/2015 | Gebert et al. | |
| 2016/0245306 A1 | 8/2016 | Berroth et al. | |
| 2016/0290358 A1 | 10/2016 | Hayamitsu et al. | |
| 2018/0242800 A1 | 8/2018 | Hayamitsu et al. | |
| 2018/0245601 A1 | 8/2018 | Hayamitsu et al. | |
| 2019/0101122 A1 | 4/2019 | Gebert | |
| 2019/0107112 A1 | 4/2019 | Chang et al. | |
| 2020/0124051 A1 | 4/2020 | Chang et al. | |
| 2021/0277910 A1 | 9/2021 | Heli et al. | |
| 2022/0003243 A1 | 1/2022 | Imahigashi et al. | |
| 2022/0023788 A1 | 1/2022 | Oh et al. | |
| 2022/0049714 A1 | 2/2022 | Haaf et al. | |
| 2023/0066531 A1 | 3/2023 | Kim et al. | |

FOREIGN PATENT DOCUMENTS

| | | |
|---|---|---|
| CN | 100594304 C | 3/2010 |
| CN | 101307769 B | 4/2013 |
| CN | 108350899 A | 7/2018 |
| CN | 111089069 A | 5/2020 |
| CN | 111379724 A | 7/2020 |
| CN | 111433463 A | 7/2020 |
| TW | 201033478 A | 9/2010 |
| TW | M413157 U | 10/2011 |
| TW | I633260 B | 8/2018 |

* cited by examiner

40

44

43

42

1a

FAN

CROSS-REFERENCE TO RELATED APPLICATION

This application is a continuation-in-part application of U.S. application Ser. No. 17/680,052 filed on Feb. 24, 2022 and entitled "DIAGONAL FAN", which claims the benefit of U.S. Provisional Application No. 63/153,868 filed on Jul. 29, 2021 and entitled "DIAGONAL FAN", and also claims priority to China Patent Application No. 202210128548.9 filed on Feb. 11, 2022. This application also claims priority to China Patent Application No. 202321185647.7 filed on May 17, 2023. The entire contents of the above-mentioned patent applications are incorporated herein by reference for all purposes.

FIELD OF THE INVENTION

The present disclosure relates to a fan, and more particularly to a fan which provides an improved heat dissipation effect for the internal thereof.

BACKGROUND OF THE INVENTION

With the increasing amount of calculation and transmission required by the communication systems, the efficiency and power consumption of electronic components in the system need to be improved to cope with huge data calculations continuously. In order to maintain the normal operation of the equipment, it is necessary to remove the internal heat of the system effectively. In the conventional communication equipment on the current market, the fan is mainly used to perform the forced convection on the system to achieve the purpose of heat dissipation. However, under increasingly severe system conditions, how to improve the efficiency of the fan effectively and maintain the same noise level has always been the goal of the industry's efforts.

Therefore, there is a need of providing a fan which is capable of providing optimized internal heat dissipation airflows for improving the efficiency thereof, and also capable of eliminating the turbulence area in the chamber thereof, thereby achieving the purposes of improving the fan characteristics and reducing the noises, so as to obviate the drawbacks encountered by the prior arts.

SUMMARY OF THE INVENTION

An object of the present disclosure is to provide a fan with an internal heat dissipation capability, such that while providing the airflow for heat dissipating an external system, an internal heat of the fan itself also can be dissipated.

An additional object of the present disclosure is to provide a fan, in which through changing the position of the circuit board and setting corresponding through holes, airflows can pass through the driving assembly inside the fan smoothly, thereby effectively improving the internal heat dissipation efficacy.

A further object of the present disclosure is to provide a fan having a frame designed to eliminate the turbulence and also reduce the noises during operating.

In accordance with an aspect of the present disclosure, a fan is provided. The fan includes a frame, an impeller, a driving assembly and a circuit board. The frame includes an inlet, an outlet, a first accommodation space, a base and a second accommodation space, wherein the inlet and the outlet are disposed at opposite sides of the frame and in fluid communication with each other through the first accommodation space, and the first accommodation space is separated from the second accommodation space. The impeller is disposed in the first accommodation space and on the base. The driving assembly is disposed between the base and the impeller. The circuit board is disposed in the second accommodation space. The base includes a plurality of first through holes, and the impeller includes a plurality of second through holes. During the fan is operating, a first airflow is formed to flow from the inlet to the outlet, and a second airflow is formed to flow through the driving assembly via the plurality of first through holes and the plurality of second through holes.

In an embodiment, the driving assembly is an inner rotor motor including a bearing housing disposed on the base and a magnetic shell covered on the bearing housing, and wherein the magnetic shell includes a plurality of third through holes corresponding to the plurality of second through holes, and the bearing housing includes a plurality of fourth through holes corresponding to the plurality of second through holes.

In an embodiment, the bearing housing and the base are integrally formed.

In an embodiment, the driving assembly is an outer rotor motor including a magnetic shell, and the magnetic shell includes a plurality of third through holes corresponding to the plurality of second through holes.

In an embodiment, when the fan is in an environment without backpressure, the second airflow flows in from the plurality of first through holes and flows out through the plurality of second through holes.

In an embodiment, when the fan is in an environment with backpressure, the second airflow flows in from the plurality of second through holes and flows out through the plurality of first through holes.

In an embodiment, a ratio of a distance between the plurality of second through holes and a top surface of the frame to a height of the frame is ranged from 0.2 to 0.5.

In an embodiment, a ratio of a distance between the plurality of second through holes and a top surface of the impeller to a height of the impeller is ranged from 0.2 to 0.6.

In an embodiment, the second accommodation space includes a first opening and a second opening, the first opening is disposed at a same side with the inlet and the second opening is disposed at a same side with the outlet, and wherein during the fan is operating, a third airflow is formed to flow in the second accommodation space from the second opening and flow out through the first opening.

In an embodiment, the frame includes an upper frame and a lower frame assembled with each other to form the inlet, the outlet and the first accommodation space, and wherein the inlet is disposed on the upper frame, the outlet and the base are disposed on the lower frame, and the second accommodation space is located at a lateral side of the lower frame.

In an embodiment, the frame includes a covering plate assembled with the lower frame to form the second accommodation space therebetween.

In an embodiment, the upper frame includes a guiding wall disposed at a periphery of the inlet, the impeller includes a conical section shell, and the conical section shell, the upper frame and the guiding wall collectively form a backflow channel.

In an embodiment, the backflow channel includes an intake section, a horizontal section and an exhaust section, the intake section is formed between an outer wall surface of the conical section shell and an inner wall surface of the upper frame, the horizontal section is formed between a lower wall surface of the guiding wall and a top surface of the conical section shell, and the exhaust section is formed between the lower wall surface of the guiding wall and an inner wall surface of the conical section shell, and wherein during the fan is operating, a fourth airflow is formed to flow in the backflow channel from the intake section, flow through the horizontal section, and flow out through the exhaust section.

In an embodiment, the conical section shell includes a plurality of balance holes disposed on the top surface thereof, and the horizontal section is spatially corresponding to the plurality of balance holes.

In an embodiment, a label having at least one notch is further provided, wherein the label is attached to a bottom surface of the base, and the at least one notch is corresponding to at least one of the plurality of first through holes.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1A:
FIG. 1A is a schematic view illustrating a fan according to an embodiment of the present disclosure from an upper view angle.
Figure 1B:
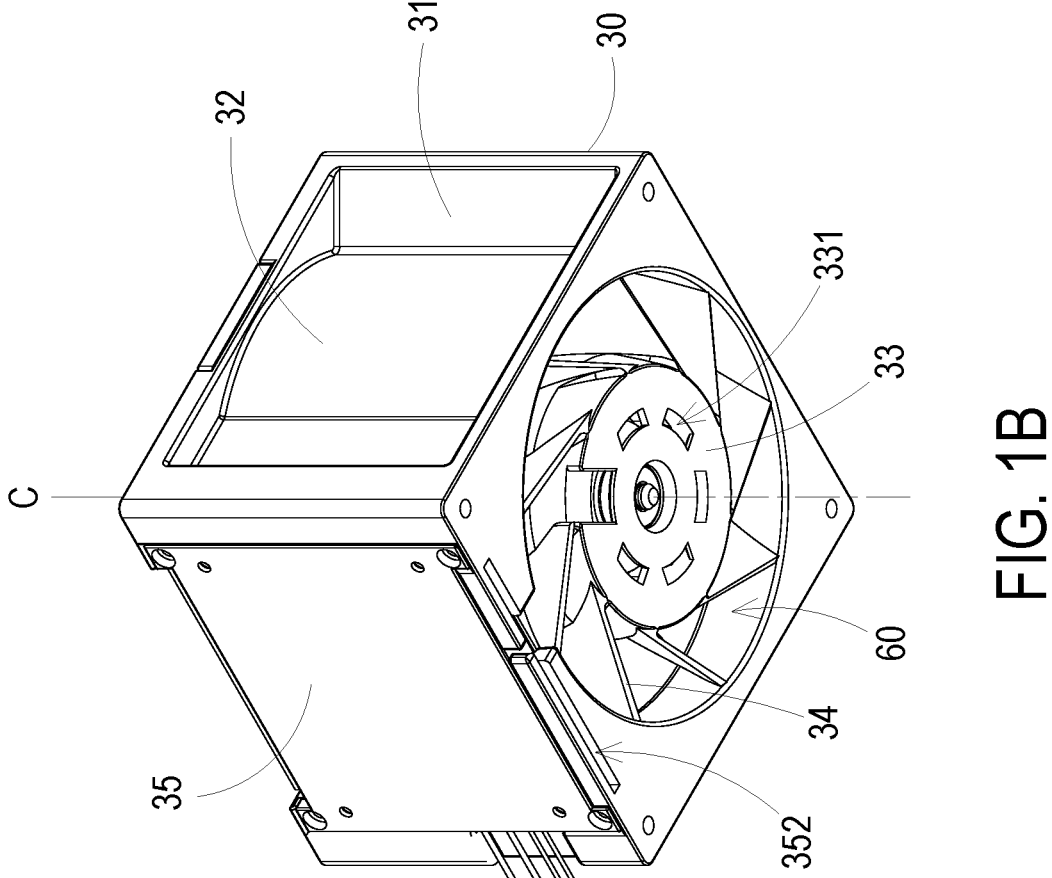
FIG. 1B is a schematic view illustrating the fan according to an embodiment of the present disclosure from a lower view angle.
Figure 2:
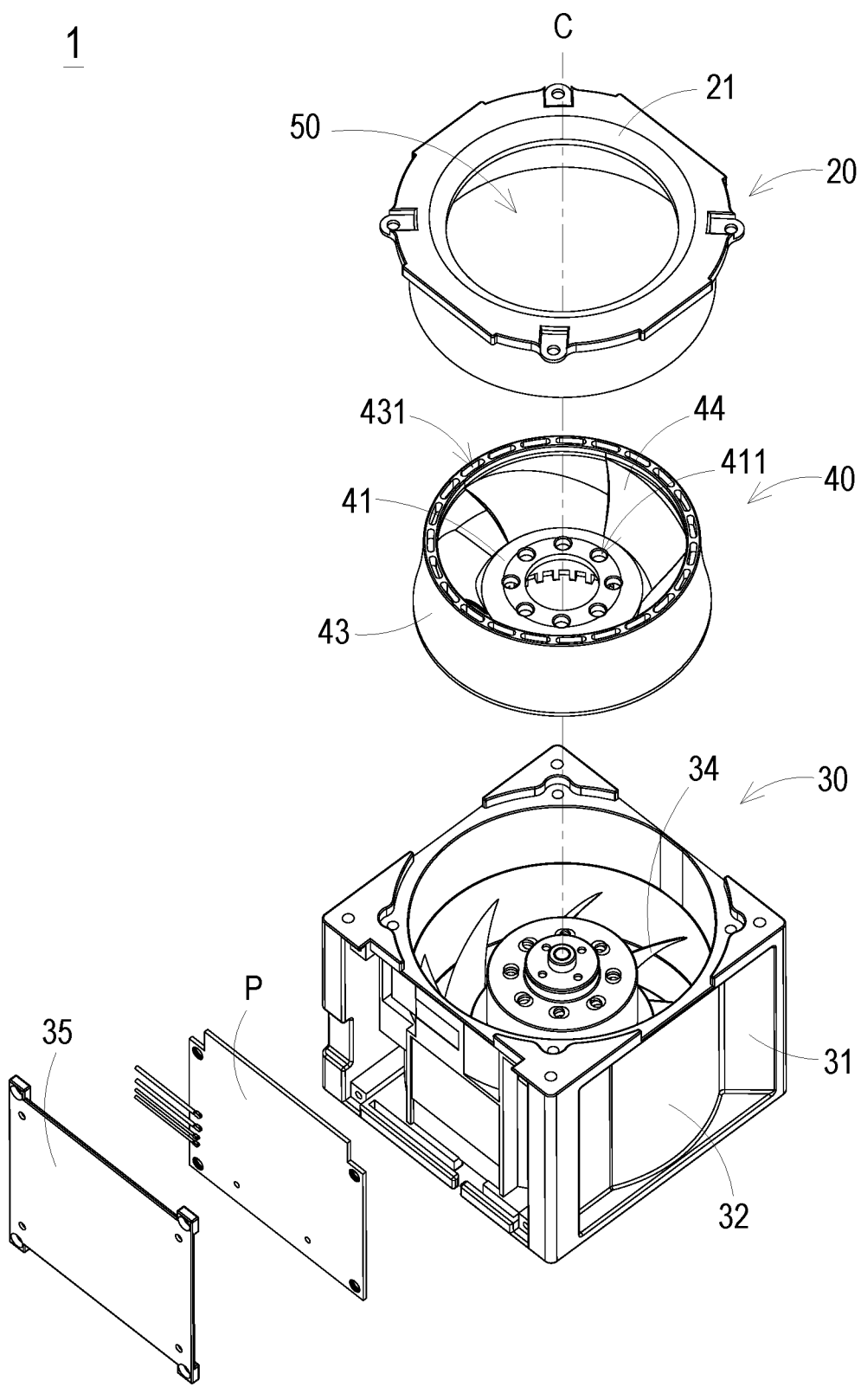
FIG. 2 is an exploded view illustrating the fan according to an embodiment of the present disclosure.
Figure 3A:
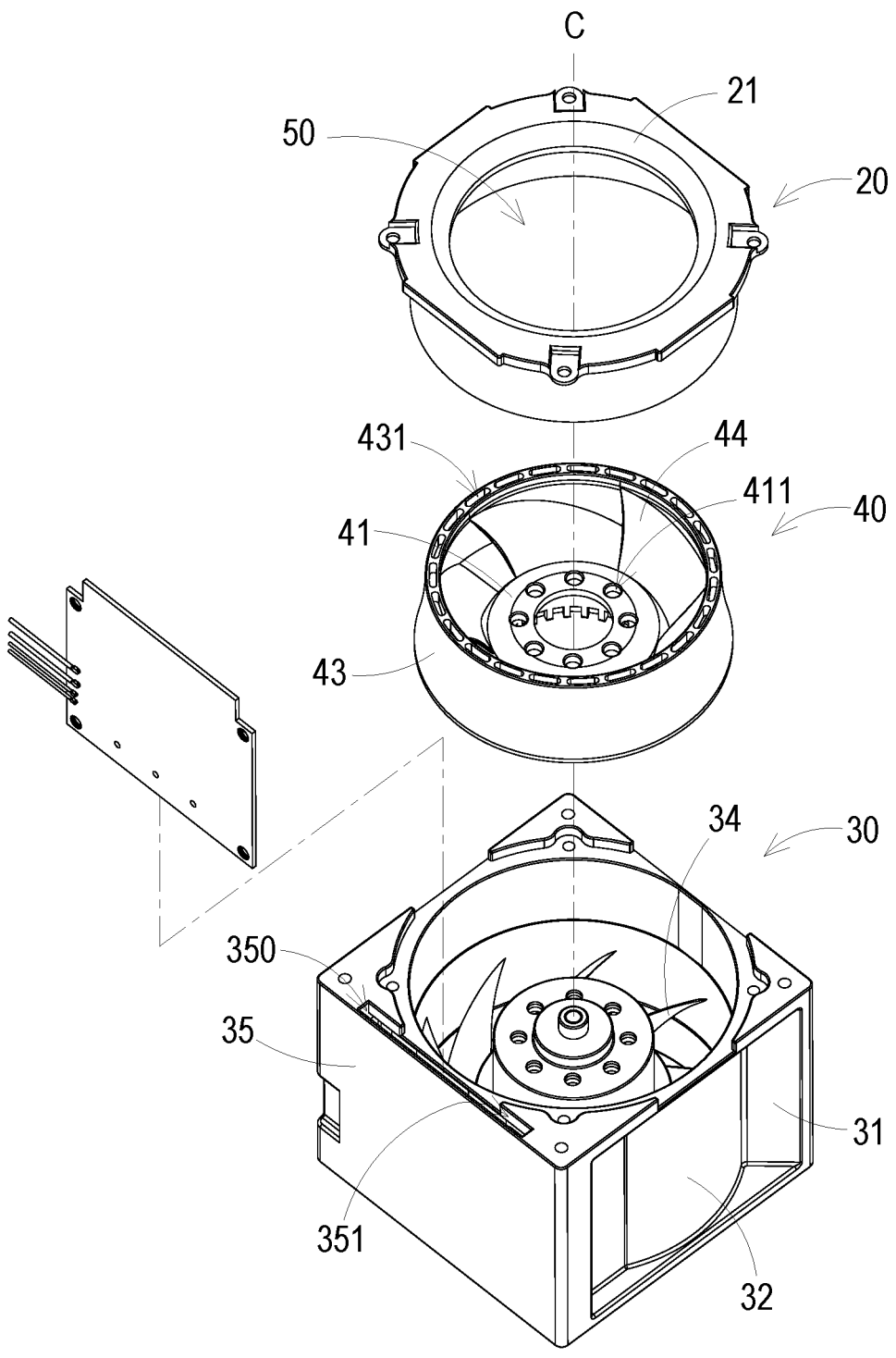
FIG. 3A is an exploded view illustrating a fan according to another embodiment of the present disclosure.
Figure 3B:
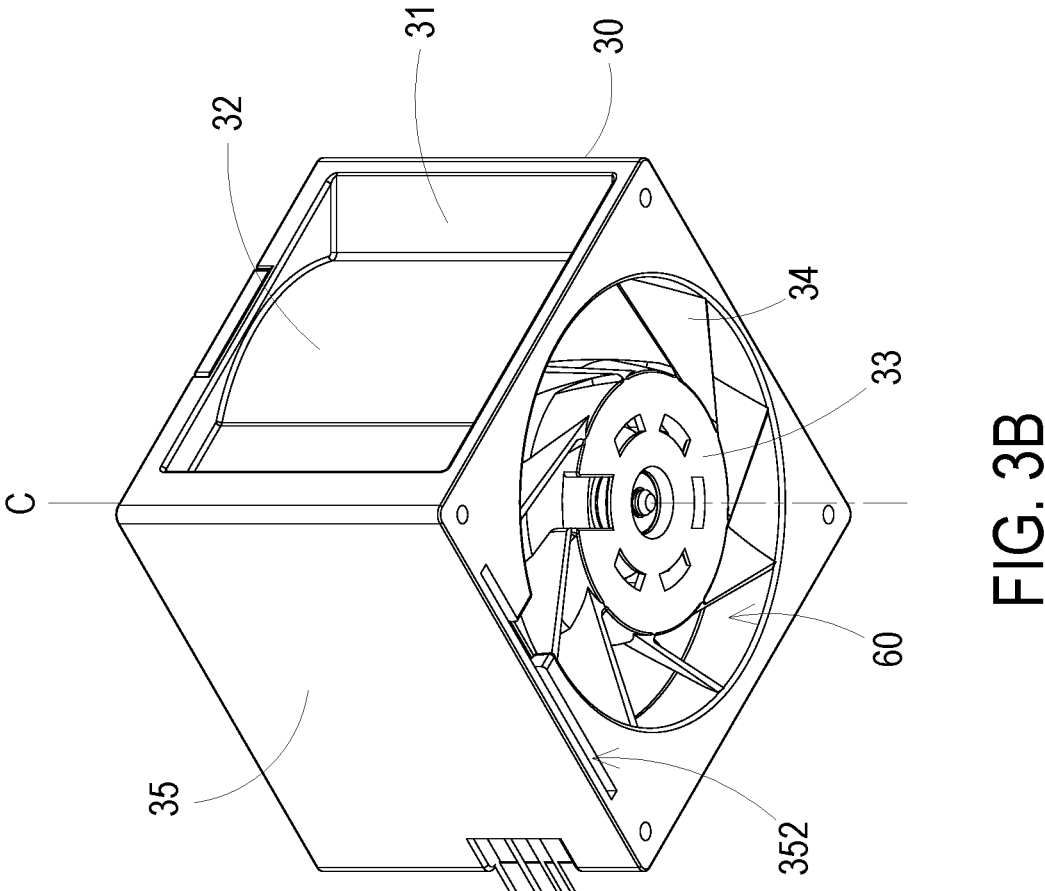
FIG. 3B is a schematic view illustrating the fan according to another embodiment of the present disclosure from a lower view angle.
Figure 4A:
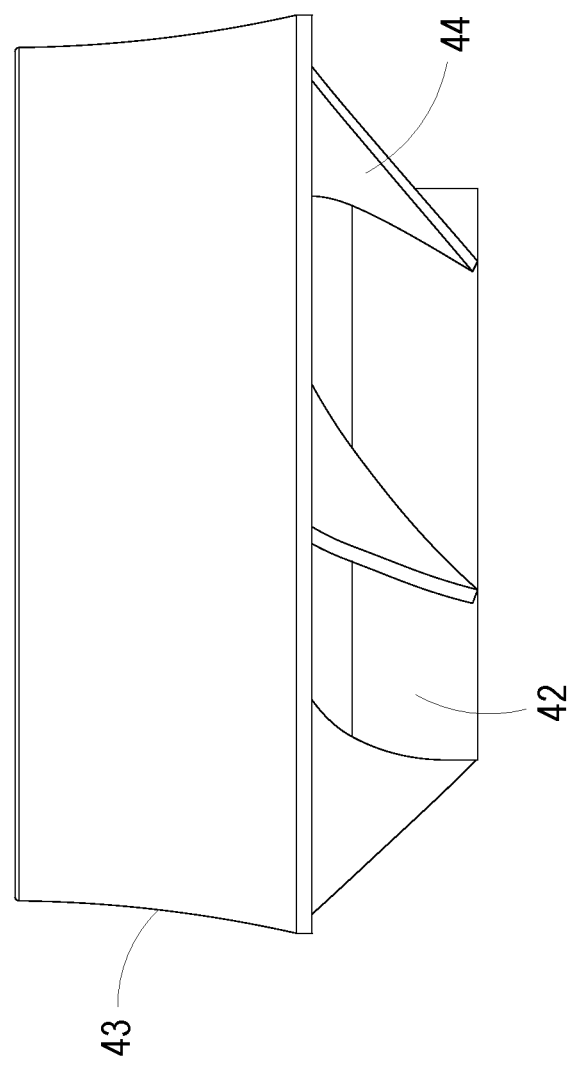
FIG. 4A is a side view illustrating an impeller according to an embodiment of the present disclosure.
Figure 4B:
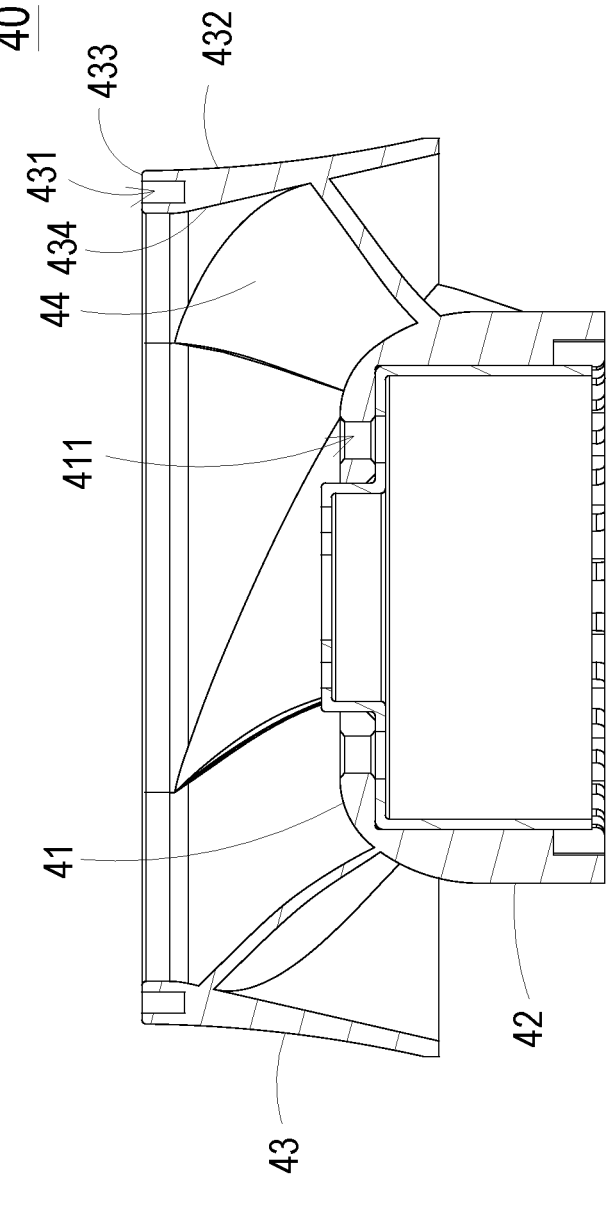
FIG. 4B is a sectional view illustrating the impeller according to an embodiment of the present disclosure.

Please refer to FIGS. 1A-1B, FIG. 2, FIGS. 3A-3B and FIGS. 4A-4B. FIG. 1A is a schematic view illustrating a fan according to an embodiment of the present disclosure from an upper view angle. FIG. 1B is a schematic view illustrating the fan according to an embodiment of the present disclosure from a lower view angle. FIG. 2 is an exploded view illustrating the fan according to an embodiment of the present disclosure. FIG. 3A is an exploded view illustrating a fan according to another embodiment of the present disclosure. FIG. 3B is a schematic view illustrating the fan according to another embodiment of the present disclosure from a lower view angle. FIG. 4A is a side view illustrating an impeller according to an embodiment of the present disclosure. FIG. 4B is a sectional view illustrating the impeller according to an embodiment of the present disclosure. A fan 1 includes a frame 10 and an impeller 40. The frame 10 includes an upper frame 20 and a lower frame 30 assembled with each other to form an accommodation space 100 for accommodating the impeller 40. In the embodiment, the upper frame 20, the impeller 40 and the lower frame 30 are arranged along the axial direction C, so that the impeller 40 is placed in the accommodation space 100 when the upper frame 20 and the lower frame 30 are assembled together.

The upper frame 20 includes an inlet 50 and a guiding wall 21 disposed thereon. The inlet 50 is a circular opening which runs through the upper frame 20. The guiding wall 21 is extended downwardly from the periphery of the inlet 50 into the accommodation space 100 along the axial direction C. In the embodiment, the guiding wall 21 is an annular curved surface in appearance for introducing the air into the accommodation space 100 when the impeller 40 is rotated.

The lower frame 30 includes an outer frame part 31, an inner frame part 32, a base 33, a plurality of static blades 34 and a covering plate 35. The base 33 includes a plurality of first through holes 331 disposed thereon. The inner frame part 32 is disposed inside the outer frame part 31, the base 33 is disposed inside the inner frame part 32, and the plurality of static blades 34 are disposed between the inner frame part 32 and the base 33. Two opposite edges of each static blade 34 are respectively connected to the inner frame part 32 and the base 33, so as to form an outlet between the inner frame part 32 and the base 33. Accordingly, the inlet and the outlet 60 are located at opposite sides of the frame 10. When the impeller 40 is rotated, the air is introduced into the accommodation space 100 through the inlet 50, passes through spaces among the plurality of static blades 34, the base 33 and the inner frame part 32, and is discharged out through the outlet 60. The covering plate 35 is disposed at the outside of the outer frame part 31 and the inner frame part 32 to form a second accommodation space 350 for accommodating a circuit board P. In the embodiment, the inner frame part 32 has a cylindrical shape, the outer frame part 31 is a cubic frame disposed around the periphery of the inner frame part 32, and the covering plate 35 is assembled with two of the columns of the cubic frame, that is, the covering plate 35 is assembled at a lateral side of the cubic frame. Therefore, the second accommodation space 350 is formed among the covering plate 35, the inner frame part 32 and the outer frame part 31. In other words, the second accommodation space 350 is formed at a lateral side of the lower frame 30.

The second accommodation space 350 includes a first opening 351 and a second opening 352. The first opening 351 is at the same side with the inlet 50 of the frame 10, and the second opening 352 is at the same side with the outlet 60 of the frame 10. In that, the first opening 351 and the second opening 352 are also located at opposite sides of the frame 10.

More specifically, the first accommodation space 100 and the second accommodation space 350 are two spaces which are separated through a structural design of the lower frame 30, and flowing directions of the air in both spaces are parallel to the axial direction C. In the embodiment, since the circuit board P is disposed in the second accommodation space 350, the center point of the frame 10 is not overlapped with the axis C, but is more biased towards the covering plate than the axis C.

In another embodiment, as shown in FIGS. 3A-3B, the lower frame 30 is implemented as one single component, namely, the outer frame part 31, the inner frame part 32, the base 33, the plurality of static blades 34 and the covering plate 35 are formed integrally, and the second accommodation space 350 with the first opening 351 and the second opening 352 is disposed at the lateral side of the lower frame 30 for accommodating the circuit board P. In other words, all the structures of the lower frame 30 can be implemented to be one single component or plural components in accordance with the practical requirements. For example, it also can be the outer frame part 31 and the covering plate 35 are integrally formed as one component, the inner frame part 32, the base 33 and the plurality of static blades 34 are integrally formed as another component, and two components are assembled to form the lower frame 30, but not limited thereto.

The impeller 40 is assembled on the base 33 of the lower frame 30, so as to form a space for accommodating a driving assembly, such as, a motor, of the fan 1. The impeller 40 includes a hub 41, a cylindrical part 42, a conical section shell 43 and a plurality of blades 44. The hub 41 includes a plurality of second through holes 411 which are exposed through the inlet 50. A top surface 433 of the conical section shell 43 has a plurality of balance holes 431 disposed thereon, and the number, the shape and the size of the balance holes 431 are adjustable in accordance with the practical requirements. The plurality of blades 44 are connected between the conical section shell 43 and the hub 41 with the cylindrical part 42, namely, the plurality of blades 44 are disposed around the periphery of the hub 41 and the cylindrical part 42. The top surface 433 of the conical section shell 43 is higher in the axial direction C than the outer edge tips of the plurality of blades 44 which are connected with the conical section shell 43, and thus, the top surface 433 of the conical section shell 43 is also higher than the top of the hub 41.

Under the architecture described above, first, due to the first through holes 331 disposed on the base 33 and the second through holes 411 disposed on the hub 41, when the fan 1 is operating, namely, the impeller 40 is rotating, the air not only flows in from the outlet 50, passes through the static blades 34 and flows out through the outlet 60, but also flows between the first through holes 331 and the second through holes 411. That is, the air also flows in the space formed between the impeller 40 and the base 33. Further, because the circuit board P is disposed in the second accommodation space 350 and not in the space formed between the impeller 40 and the base 33, the flowing path of the air between the first through holes 331 and the second through holes 411 would not be blocked by the circuit board, and accordingly, a heat dissipation effect of the airflow for the driving assembly therein can be effectively improved. This architecture is suitable for different types of driving assemblies of the fan, and followings are the detailed descriptions when the inner rotor motor and the outer rotor motor are respectively adopted as the driving assembly.

Figure 5A:
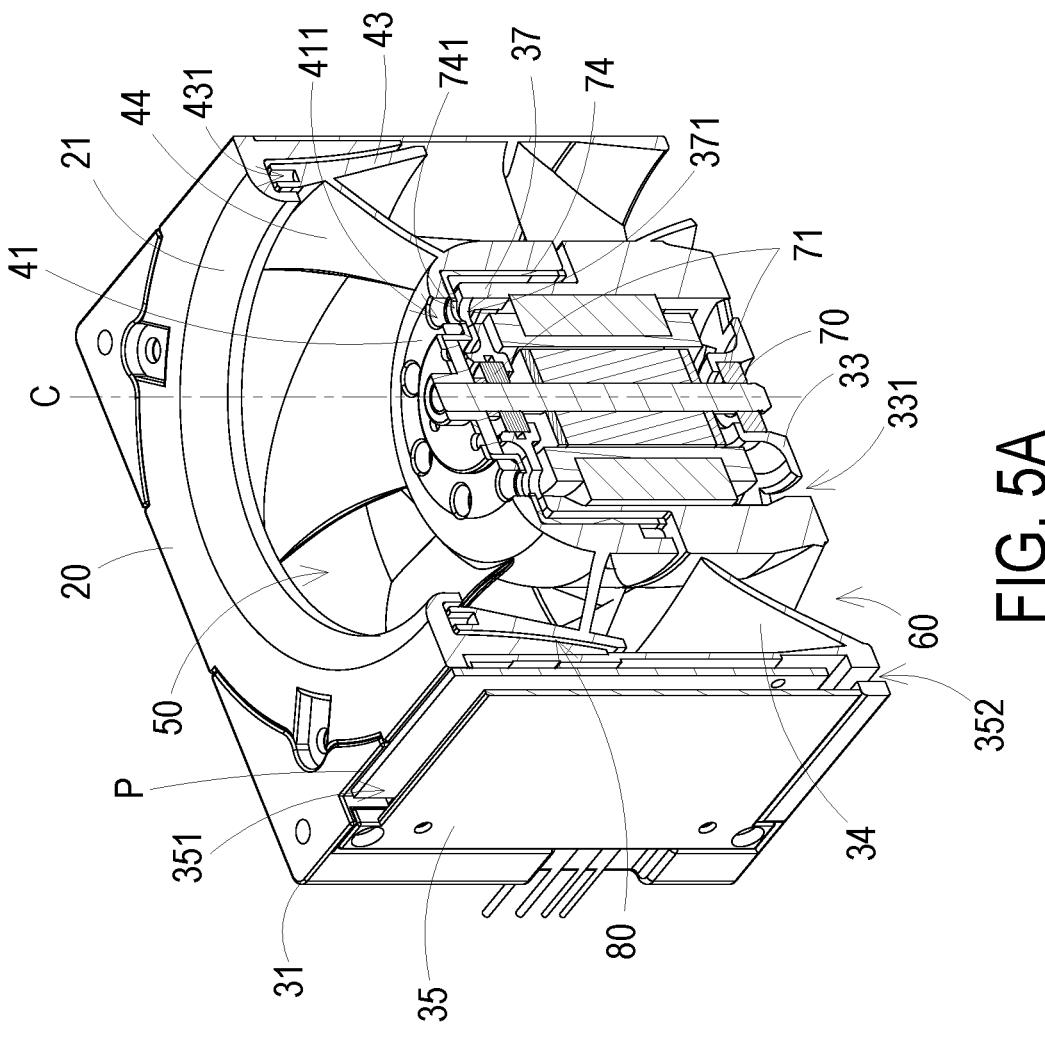
FIG. 5A is a cross-section structural view illustrating a fan adopting an inner rotor motor according to an embodiment of the present disclosure.
Figure 5B:
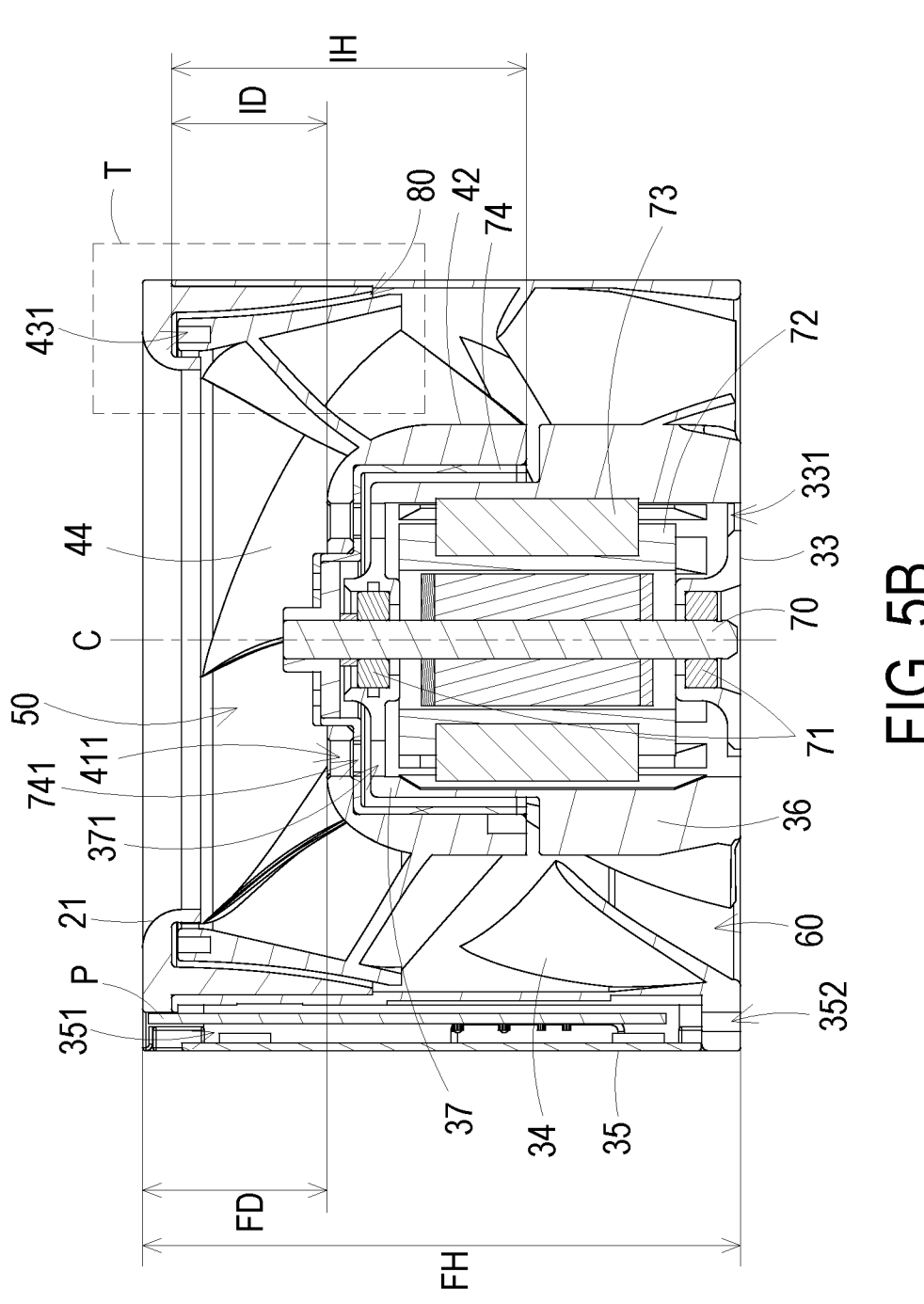
FIG. 5B is a sectional view illustrating the fan adopting the inner rotor motor according to the embodiment of the present disclosure.
Figure 6:
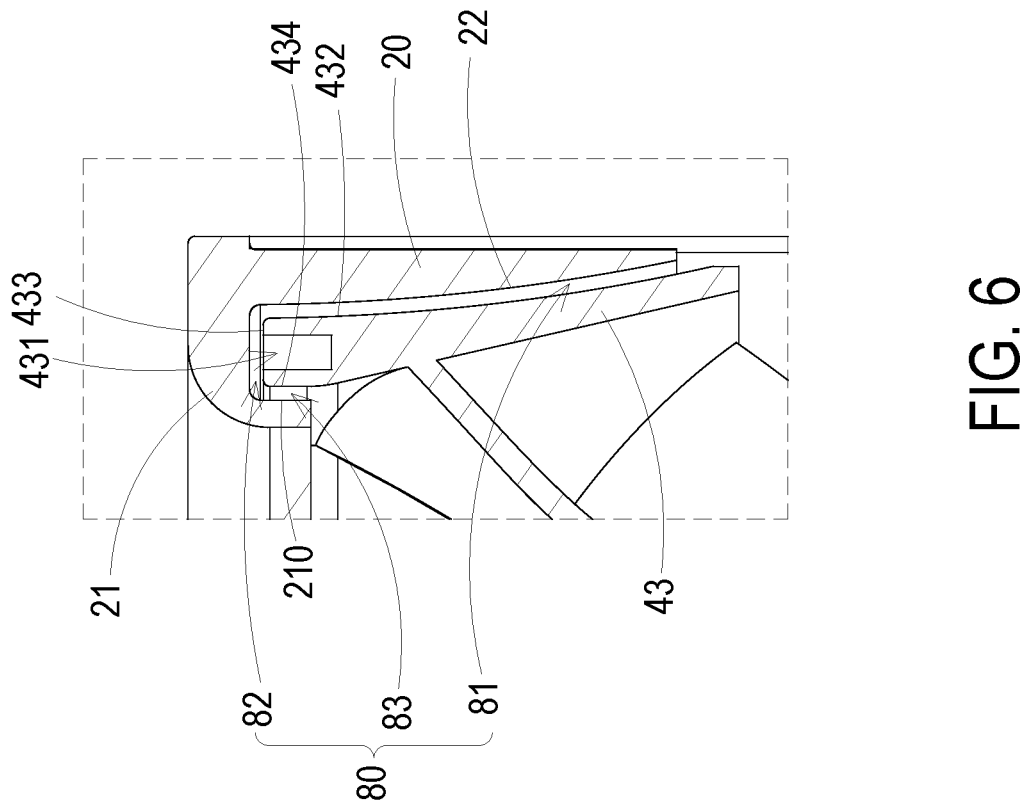
FIG. 6 is an enlarged view showing the region T in FIG. 5A.

Please refer to FIGS. 5A-5B and FIG. 6. FIG. 5A is a cross-section structural view illustrating a fan adopting an inner rotor motor according to an embodiment of the present disclosure, FIG. 5B is a sectional view illustrating the fan adopting the inner rotor motor according to the embodiment of the present disclosure, and FIG. 6 is an enlarged view showing the region T in FIG. 5A. The fan 1a has similar structures and functions of the frame 10 and the impeller 40 in the fan 1, and all the similar parts are not redundantly described herein. In the embodiment, on the basis of adopting the inner rotor motor, the base 33 of the lower frame 30 is upwardly extended to have a bottom rim 36, and a bearing housing 37 is disposed on the bottom rim 36. A shaft 70 is disposed between the base 33 and the bearing housing 37, magnets 72 and windings 73 are disposed around the shaft 70, and a magnetic shell 74 is covered on top of the bearing housing 37. The impeller 40 is further covered on top of the magnetic shell 74 with the cylindrical part 42 disposed on the bottom rim 36. In an embodiment, the bearing housing 37 and the bottom rim 36 are implemented as separated components which are assembled together, and in another embodiment, the bearing housing 37, the bottom rim 36 and the base 33 are integrally formed as one single component. Therefore, the structure can be varied in accordance with the practical requirements without limitation. Moreover, it is further implemented that the magnetic shell 74 includes a plurality of third through holes 741 corresponding to the plurality of second through holes 411 of the hub 41, and the bearing housing 37 includes a plurality of fourth through holes 371 corresponding to the plurality of second through holes 411, so that the airflow can smoothly flow in and out of the internal of the motor.

As shown in FIG. 6, a backflow channel 80 is further formed between the upper frame 20 and the impeller 40. The backflow channel 80 includes an intake section 81, a horizontal section 82 and an exhaust section 83, wherein the intake section 81 is in fluid communication with the exhaust section 83 through the horizontal section 82. The intake section 81 is formed between an outer wall surface 432 of the conical section shell 43 and an inner wall surface 22 of the upper frame 20, the horizontal section 82 is formed between a lower wall surface 210 of the guiding wall 21 and a top surface 433 of the conical section shell 43 and is spatially corresponding to the plurality of balance holes 431, and the exhaust section 83 is formed between the lower wall surface 210 of the guiding wall 21 and an inner wall surface 434 of the conical section shell 43. The direction of the horizontal section 82 is perpendicular to the axial direction C and is substantially perpendicular to the intake section 81 and the exhaust section 83, so as to form the backflow channel 80 to have at least two bending portions. Besides, a substantially fixed spacing distance is maintained throughout the backflow channel 80. The detailed structures of the backflow channels 80 of the present disclosure can be adjusted in accordance with the practical requirements. The present disclosure is not limited thereto.

Figure 7A:
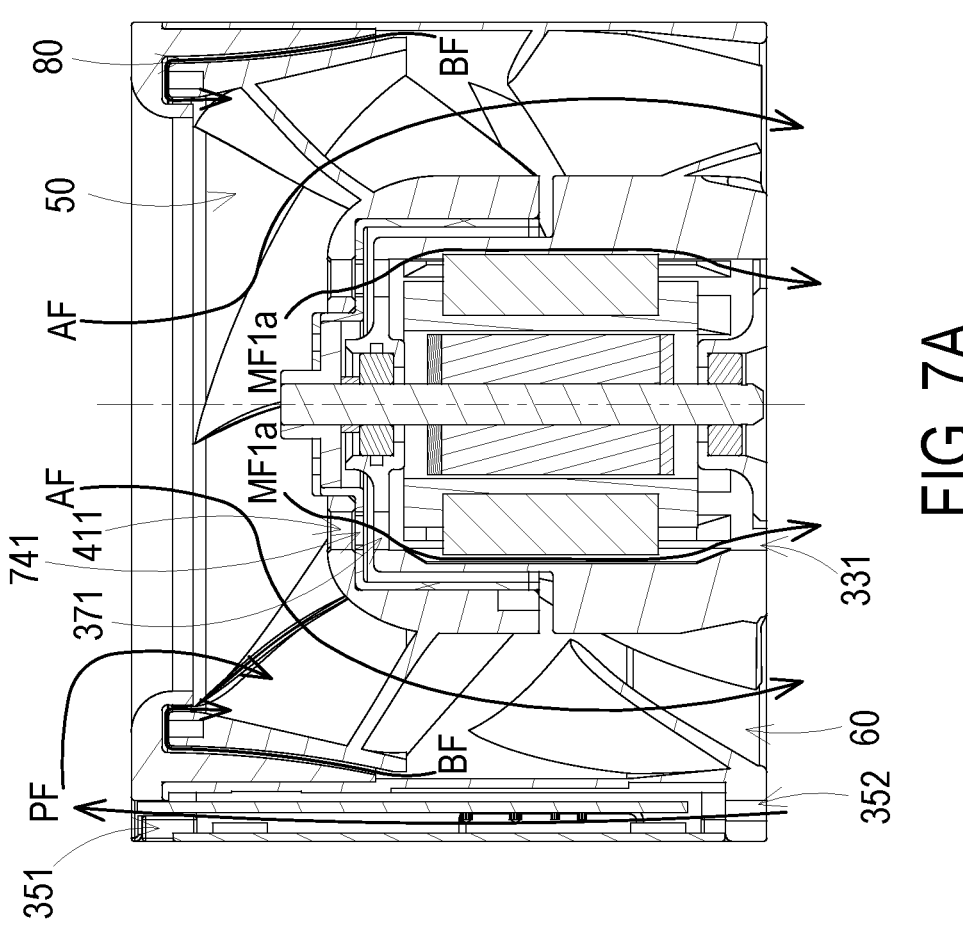
FIG. 7A is a schematic view illustrating airflows of the fan adopting the inner rotor motor in an environment without backpressure.
Figure 7B:
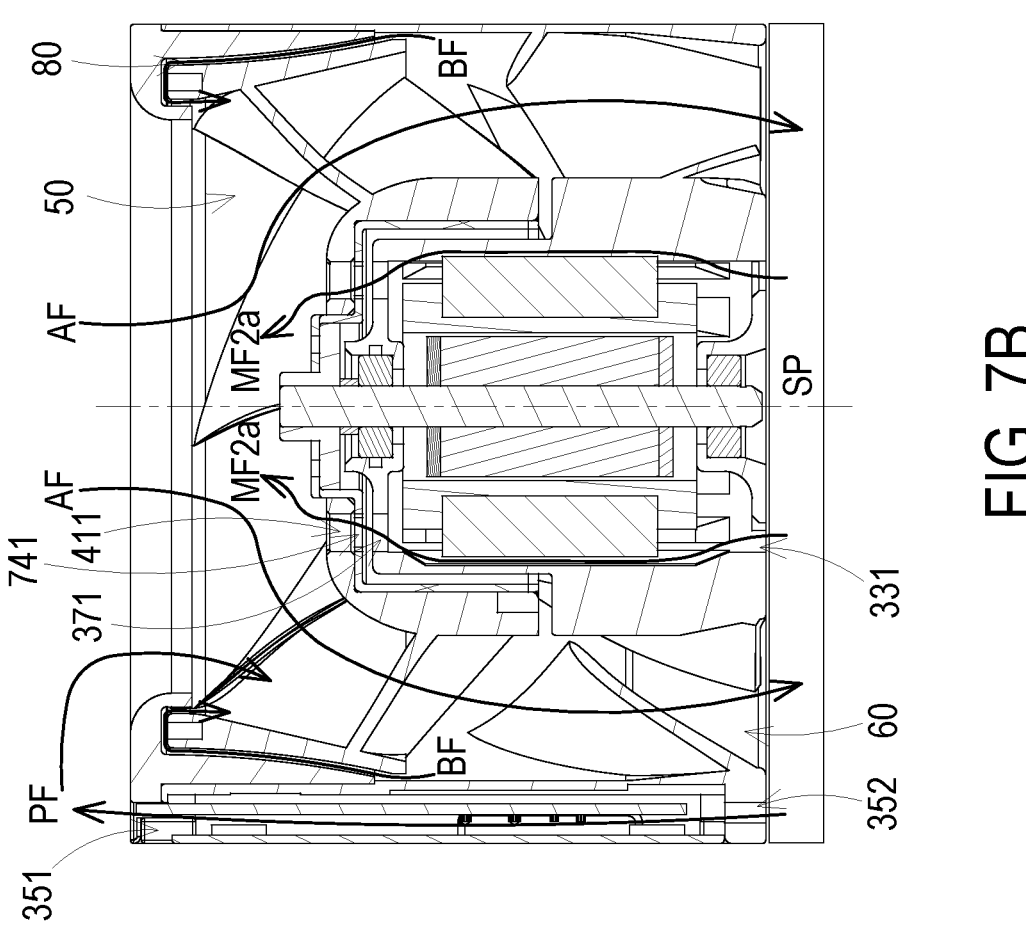
FIG. 7B is a schematic view illustrating airflows of the fan adopting the inner rotor motor in an environment with backpressure.

Please refer to FIGS. 5A-5B, FIG. 6 and FIGS. 7A-7B. FIG. 7A is a schematic view illustrating airflows of the fan adopting the inner rotor motor in an environment without backpressure, and FIG. 7B is a schematic view illustrating airflows of the fan adopting the inner rotor motor in an environment with backpressure. As shown in FIG. 7A, when in the environment without backpressure, namely, there is no object adjacent to the outlet 60 of the fan 1*a*, during the fan 1*a* is operating, a first airflow AF is formed to flow from the inlet 50 to the outlet 60. At the same time, due to the disposal of the second through holes 411 of the hub 41, the third through holes 741 of the magnetic shell 74 and the fourth through holes 371 of the bearing housing 37, a second airflow MF1*a* is also formed to pass through the internal of the motor. Since the circuit board P is moved to dispose in the second accommodation space 350, the second airflow MF1*a* can directly flow to the base 33 without being blocked by the circuit board P and flow out through the first through holes 331, so as to provide the heat dissipation effect for the internal of the motor. Moreover, a third airflow PF is also formed in the second accommodation space 350 in which the circuit board P is disposed. The third airflow PF flows in from the second opening 351 at the lower side and flows out through the first opening 351 at the upper side, thereby providing the heat dissipation effect for the circuit board P. In the embodiment, when the third airflow PF is converged into the inlet 50, the flowing direction thereof is identical to that of the first airflow AF, so that a collision of flowing fields is less likely to occur. Furthermore, since the outer diameter of the hub 41 of the impeller 40 is expended gradually in a direction from the inlet 50 toward the outlet 60, the first airflow AF is expanded gradually around the periphery of the impeller 40, and thus, a fourth airflow BF is formed to flow into the backflow channel 80 from the intake section 81, pass through the horizontal section 82, and flow out through the exhaust section 83. That is, the flowing direction of the fourth airflow BF in the intake section 81 is opposite to that of the first airflow AF, and the flowing direction of the fourth airflow BF in the exhaust section 83 is identical to that of the first airflow AF. Accordingly, when the fourth airflow BF is converged into the first airflow AF, a collision of flowing fields is less likely to occur and noises during operation are also reduced. In addition, since the backflow channel 80 is maintained to have the substantially fixed spacing distance, after the fourth airflow BF is inhaled into the backflow channel 80 from the intake section 81, the flow velocity and the kinetic energy of the flow field are reduced gradually, so that the wind resistance is increased and the turbulence intensity of the airflow in the backflow channel 80 is eliminated.

On the other hand, as shown in FIG. 7B, when in the environment with backpressure SP, namely, there is an object adjacent to the outlet 60 of the fan 1*a*, during the fan 1*a* is operating, a first airflow AF is formed to flow from the inlet 50 to the outlet 60. At the same time, due to the backpressure SP environment, a second airflow MF2*a* is formed to flow in from the first through holes 331 of the base 33 at the lower side and flow out through the second through holes 411 of the hub 41, the third through holes 741 of the magnetic shell 74 and the fourth through holes 371 of the bearing housing 37 which are at the upper side, so as to provide the heat dissipation effect for the internal of the motor. Moreover, a third airflow PF is also formed in the second accommodation space 350 in which the circuit board P is disposed. The third airflow PF flows in from the second opening 351 at the lower side, passes through the second accommodation space 350 and the circuit board P, and flows out through the first opening 351 at the upper side, thereby providing the heat dissipation effect for the circuit board P. Furthermore, a fourth airflow BF similarly flows into the backflow channel 80 from the intake section 81, passes through the horizontal section 82, and flows out through the exhaust section 83, so as to reduce the turbulence.

In the embodiment, the positions of the second through holes 411 in the first accommodation space 100 are critical. It influences not only the flowing of each airflow, but also the balance among airflows. Preferably but not exclusively, assume that a distance between the second through holes 411 and a top surface of the upper frame 20 is FD and a height of the frame 10 is FH, a ratio of FD/FH is ranged from 0.2 to 0.5. Preferably but not exclusively, assume that a distance between the second through holes 411 and a top surface of the impeller 4 is ID and a height of the impeller 4 is IH, a ratio of ID/IH is ranged from 0.2 to 0.6.

Figure 8A:
FIG. 8A is a cross-section structural view illustrating a fan adopting an outer rotor motor according to an embodiment of the present disclosure.
Figure 8A:
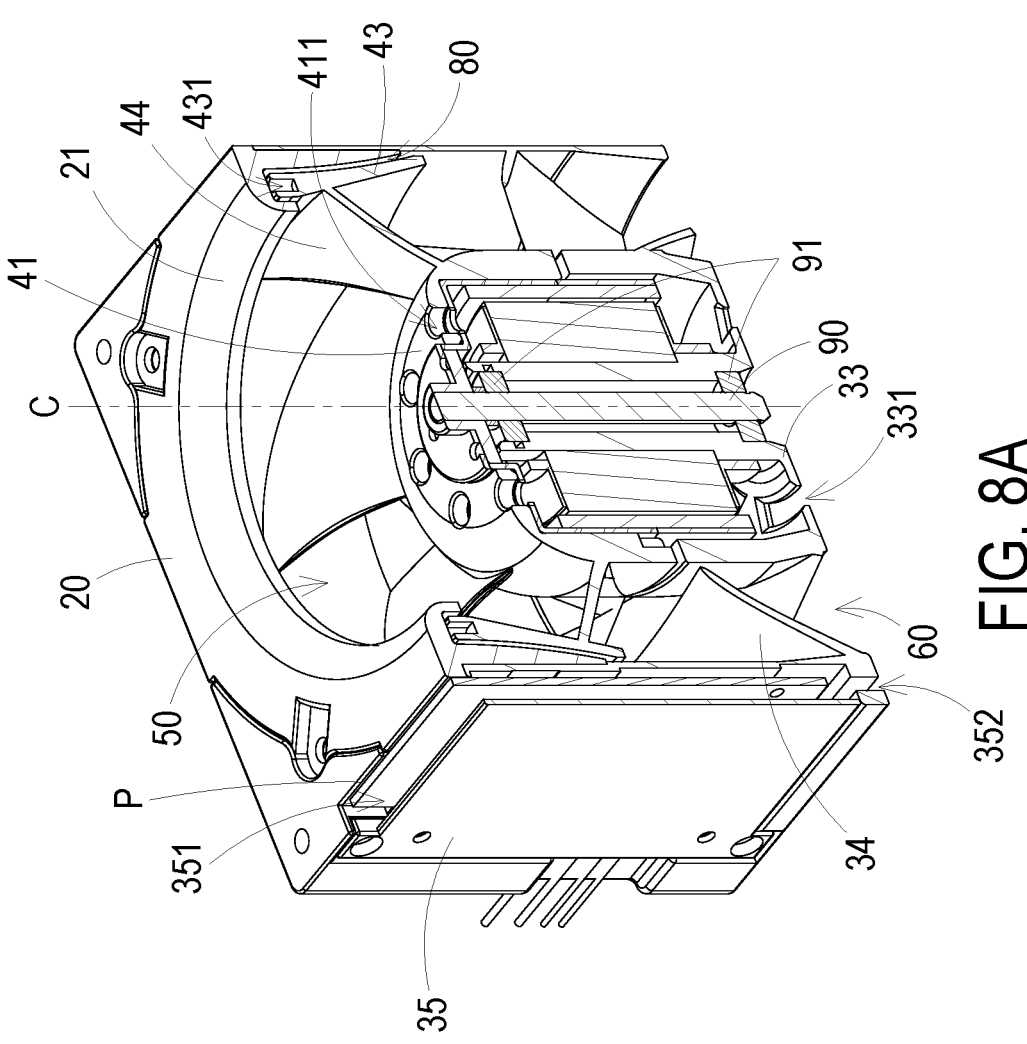
Figure 8B:
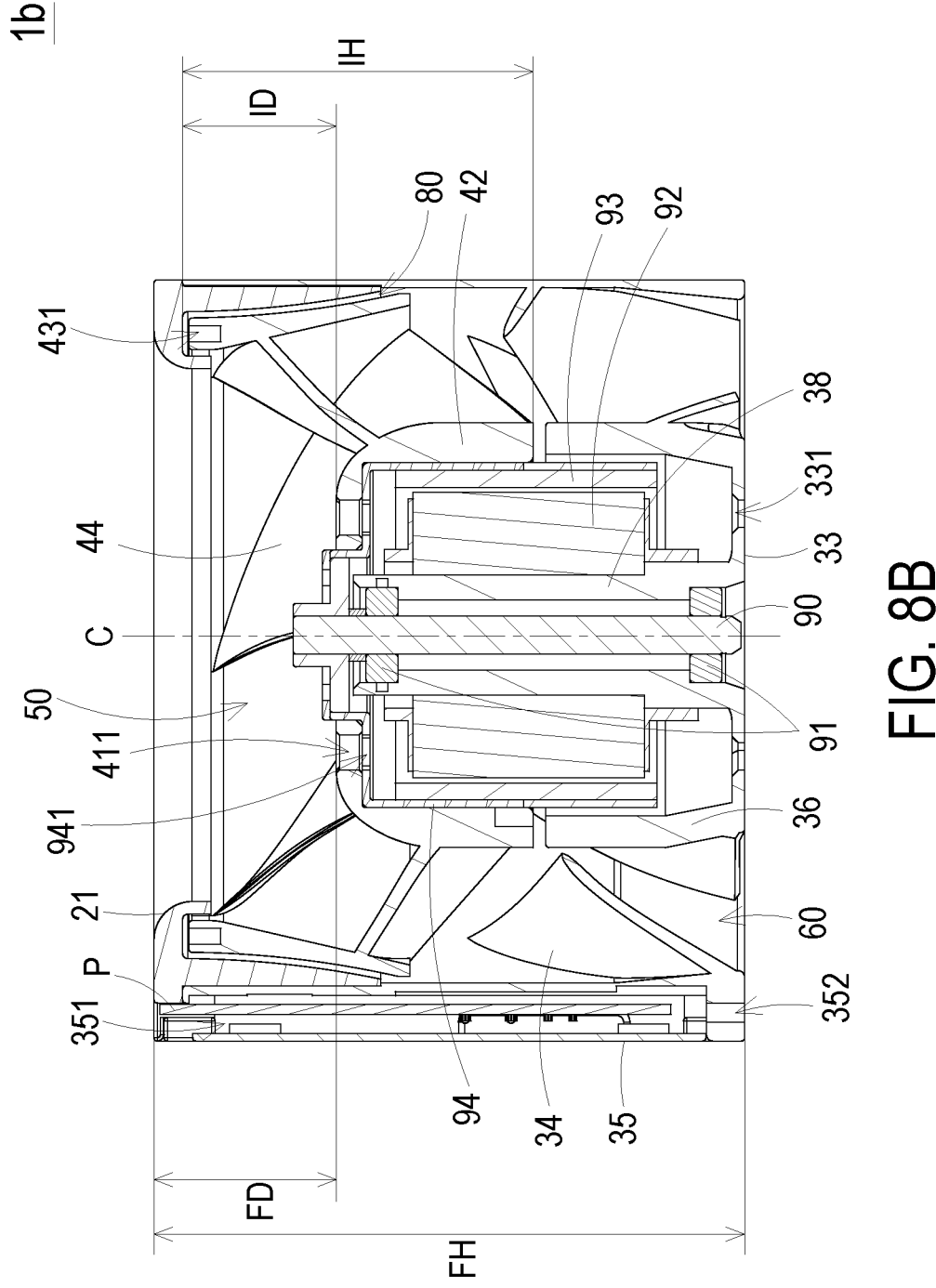
FIG. 8B is a sectional view illustrating the fan adopting the outer rotor motor according to the embodiment of the present disclosure.

Please refer to FIGS. 8A-8B. FIG. 8A is a cross-section structural view illustrating a fan adopting an outer rotor motor according to an embodiment of the present disclosure, and FIG. 8B is a sectional view illustrating the fan adopting the outer rotor motor according to the embodiment of the present disclosure. The fan 1*b* has similar structures and functions of the frame 10 and the impeller 40 in fan 1 and fan 1*a*, and all the similar parts are not redundantly described herein. In the embodiment, on the basis of adopting the outer rotor motor, the base 33 of the lower frame 30 further includes a tube 38, and a shaft 90 is disposed in the tube 38 through bearings 91. Windings 92 and magnets 93 are disposed around the shaft 90, and a magnetic shell 94 is also included. The impeller 40 is covered on top of the magnetic shell 94, and the cylindrical part 42 is disposed on the bottom rim 36. Further, the magnetic shell 94 is implemented to include a plurality of third through holes 941 corresponding to the plurality of second through holes 411 of the hub 41, so that the airflow can smoothly flow in and out of the internal of the motor. And, a backflow channel 80 is also formed between the upper frame 20 and the impeller 40.

Figure 9A:
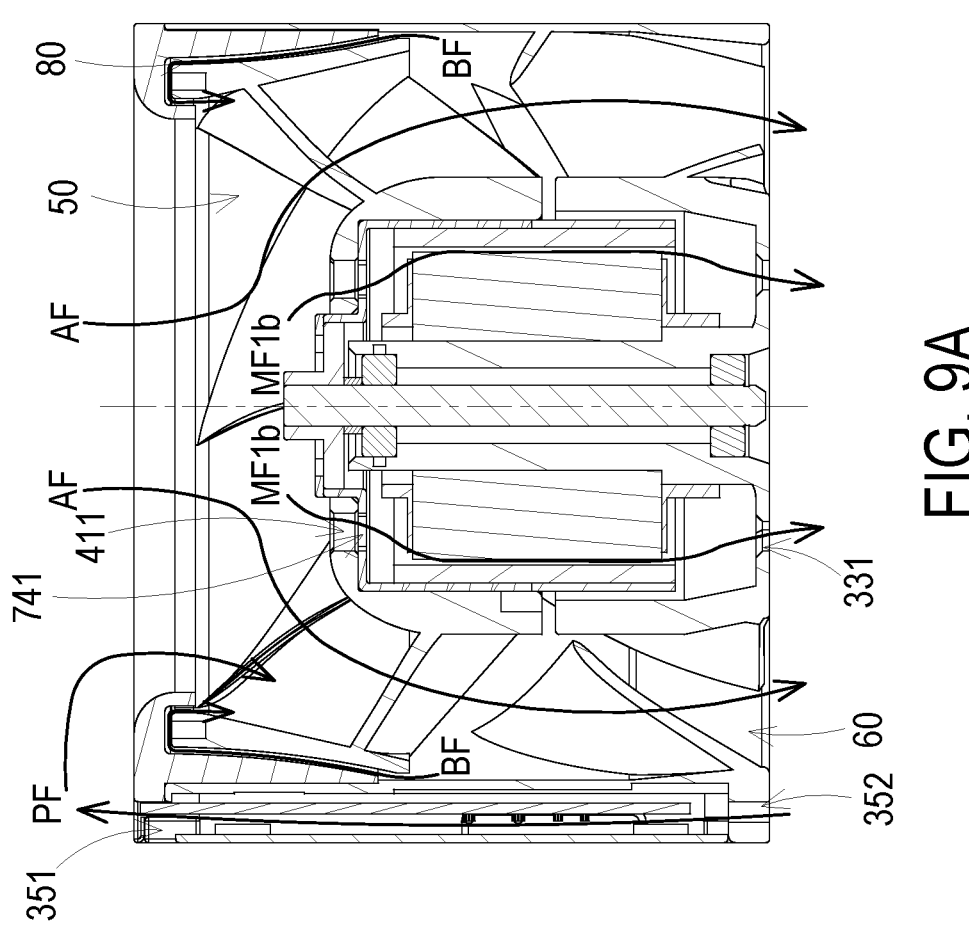
FIG. 9A is a schematic view illustrating airflows of the fan adopting the outer rotor motor in an environment without backpressure.
Figure 9B:
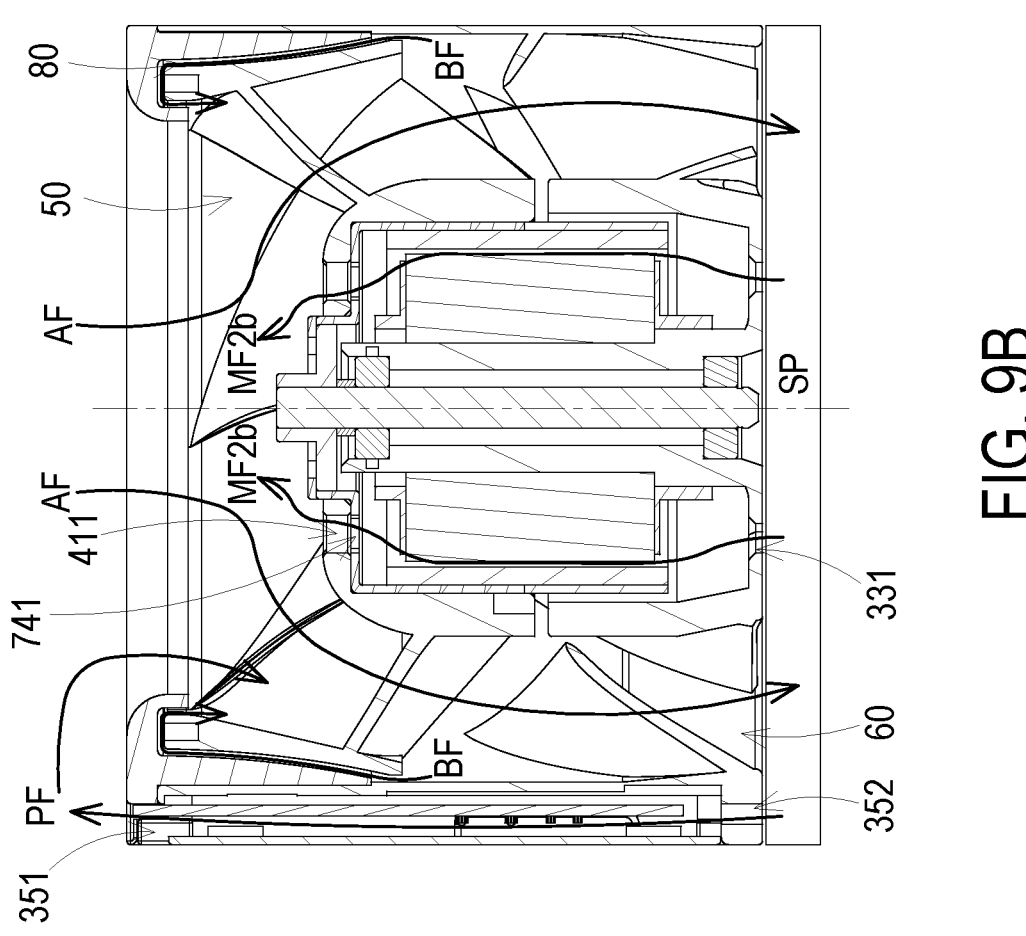
FIG. 9B is a schematic view illustrating airflows of the fan adopting the outer rotor motor in an environment with backpressure.

Please refer to FIG. 6, FIGS. 8A-8B and FIGS. 9A-9B. FIG. 9A is a schematic view illustrating airflows of the fan adopting the outer rotor motor in an environment without backpressure, and FIG. 9B is a schematic view illustrating airflows of the fan adopting the outer rotor motor in an environment with backpressure. As shown in FIG. 9A, when in the environment without backpressure, namely, there is no object adjacent to the outlet 60 of the fan 1*b*, during the fan 1*b* is operating, a first airflow AF is formed to flow from the inlet 50 to the outlet 60. At the same time, due to the disposal of the second through holes 411 of the hub 41 and the third through holes 941 of the magnetic shell 94, a second airflow MF1*b* is also formed to pass through the internal of the motor. Since the circuit board P is moved to dispose in the second accommodation space 350, the second airflow MF1*b* can directly flow to the base 33 without being blocked by the circuit board P and flow out through the first through holes 331, so as to provide the heat dissipation effect for the internal of the motor. Moreover, a third airflow PF is also formed in the second accommodation space 350 in which the circuit board P is disposed. The third airflow PF flows in from the second opening 351 at the lower side and flows out through the first opening 351 at the upper side, thereby providing the heat dissipation effect for the circuit board P. When the third airflow PF is converged into the inlet 50, the flowing direction thereof is identical to that of the first airflow AF, so that a collision of flowing fields is less likely to occur. Furthermore, since the outer diameter of the hub 41 of the impeller 40 is expended gradually in the direction from the inlet 50 toward the outlet 60, the first airflow AF is expanded gradually around the periphery of the impeller 40, and thus, a fourth airflow BF is formed to flow into the backflow channel 80 from the intake section 81, pass through the horizontal section 82, and flow out through the exhaust section 83. That is, the flowing direction of the fourth airflow BF in the intake section 81 is opposite to that of the first airflow AF, and the flowing direction of the fourth airflow BF in the exhaust section 83 is identical to that of the first airflow AF. Accordingly, when the fourth airflow BF is converged into the first airflow AF, a collision of flowing fields is less likely to occur and noises during operation are also reduced. In addition, since the backflow channel 80 is maintained to have the substantially fixed spacing distance, after the fourth airflow BF is inhaled into the backflow channel 80 from the intake section 81, the flow velocity and the kinetic energy of the flow field are reduced gradually, so that the wind resistance is increased and the turbulence intensity of the airflow in the backflow channel 80 is eliminated.

On the other hand, as shown in FIG. 9B, when in the environment with backpressure SP, namely, there is an object adjacent to the outlet 60 of the fan 1b, during the fan 1b is operating, a first airflow AF is formed to flow from the inlet 50 to the outlet 60. At the same time, due to the backpressure SP environment, a second airflow MF2b is formed to flow in from the first through holes 331 of the base 33 at the lower side and flow out through the second through holes 411 of the hub 41 and the third through holes 941 of the magnetic shell 94 which are at the upper side, so as to provide the heat dissipation effect for the internal of the motor. Moreover, a third airflow PF is also formed in the second accommodation space 350 in which the circuit board P is disposed. The third airflow PF flows in from the second opening 351 at the lower side, passes through the second accommodation space 350 and the circuit board P, and flows out through the first opening 351 at the upper side, thereby providing the heat dissipation effect for the circuit board P. Furthermore, a fourth airflow BF similarly flows into the backflow channel 80 from the intake section 81, passes through the horizontal section 82, and flows out through the exhaust section 83, so as to reduce the turbulence.

In the embodiment, the positions of the second through holes 411 in the first accommodation space 100 are critical. It influences not only the flowing of each airflow, but also the balance among airflows. Preferably but not exclusively, assume that a distance between the second through holes 411 and a top surface of the upper frame 20 is FD and a height of the frame 10 is FH, a ratio of FD/FH is ranged from 0.2 to 0.5. Preferably but not exclusively, assume that a distance between the second through holes 411 and a top surface of the impeller 4 is ID and a height of the impeller 4 is IH, a ratio of ID/IH is ranged from 0.2 to 0.6.

It is known from the above that through designing the structure of the frame, changing the position of the circuit board, and disposing through holes at corresponding positions, the fan of the present disclosure can naturally generate airflows for heat dissipating the driving assembly and also the circuit board thereof during operating, thereby improving the performance of the fan effectively. Further, this design is suitable for various kinds of driving assemblies, such as, the inner rotor motor and the outer rotor motor, without limitation.

Figure 10:
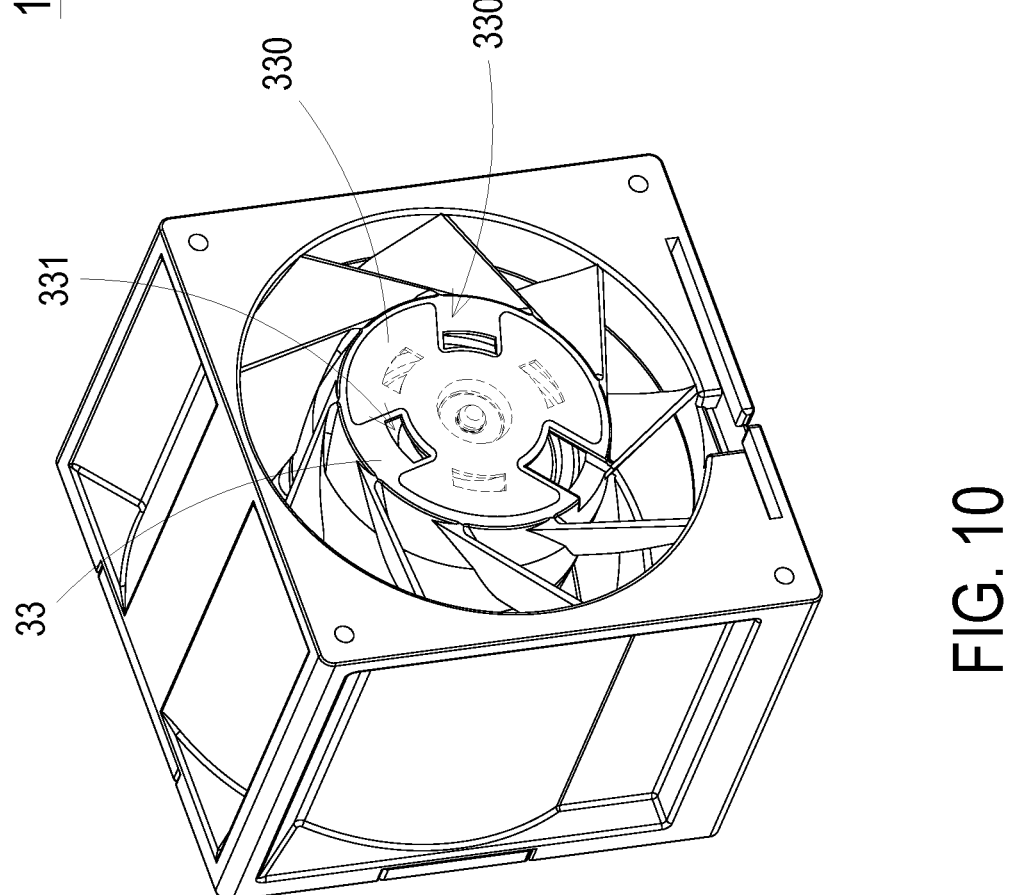
FIG. 10 is a schematic view illustrating a fan according to another embodiment of the present disclosure.

Please refer to FIG. 10 which is a schematic view illustrating a fan according to another embodiment of the present disclosure. In response to the disposal of the first through holes 331 on the base 33, a label 330 which is attached to the bottom surface of the base 33 is implemented to have at least one notch 3301 for exposing at least one of the first through holes 331, so as to prevent from blocking the flow-out of the second airflows MF1a, MF1b and the flow-in of the second airflows MF2a, MF2b, thereby improving the circulations of airflows.

In summary, the fan of the present disclosure achieves the improvement of heat dissipation for the internal thereof through designing the structure of the frame. The frame is separated into two spaces for respectively disposing the circuit board and the driving assembly, and the impeller and the base of the frame which form the space for disposing the driving assembly both have through holes disposed thereon, so that during the fan is operating, airflows which respectively pass through the driving assembly and the circuit board can be generated at the same time, thereby increasing the airflows for heat dissipating the internal of the fan. Further, the frame also includes the backflow channel for eliminating the turbulence and also reducing the noises.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A fan, comprising:
   a frame comprising an inlet, an outlet, a first accommodation space, a base and a second accommodation space, wherein the inlet and the outlet are disposed at opposite sides of the frame and in fluid communication with each other through the first accommodation space, and the first accommodation space is separated from the second accommodation space;
   an impeller disposed in the first accommodation space and on the base; and
   a driving assembly disposed between the base and the impeller; and
   a circuit board disposed in the second accommodation space,
   wherein the base comprises a plurality of first through holes, and the impeller comprises a plurality of second through holes;
   wherein when the fan is operating, a first airflow is formed to flow from the inlet to the outlet, and a second airflow is formed to flow through the driving assembly via the plurality of first through holes and the plurality of second through holes; and
   wherein a ratio of a distance between the plurality of second through holes and a top surface of the frame to a height of the frame is ranged from 0.2 to 0.5.

2. The fan as claimed in claim 1, wherein the driving assembly is an inner rotor motor comprising a bearing housing disposed on the base and a magnetic shell covered on the bearing housing, and wherein the magnetic shell comprises a plurality of third through holes corresponding to the plurality of second through holes, and the bearing housing comprises a plurality of fourth through holes corresponding to the plurality of second through holes.

3. The fan as claimed in claim 2, wherein the bearing housing and the base are integrally formed.

4. The fan as claimed in claim 1, wherein the driving assembly is an outer rotor motor comprising a magnetic shell, and the magnetic shell comprises a plurality of third through holes corresponding to the plurality of second through holes.

5. The fan as claimed in claim 1, wherein when the fan is in an environment without backpressure, the second airflow flows in from the plurality of first through holes and flows out through the plurality of second through holes.

6. The fan as claimed in claim 1, wherein when the fan is in an environment with backpressure, the second airflow flows in from the plurality of second through holes and flows out through the plurality of first through holes.

7. The fan as claimed in claim 1, wherein the second accommodation space comprises a first opening and a second opening, the first opening is disposed at a same side with the inlet and the second opening is disposed at a same side with the outlet, and wherein during the fan is operating, a third airflow is formed to flow in the second accommodation space from the second opening and flow out through the first opening.

8. The fan as claimed in claim 1, wherein the frame comprises an upper frame and a lower frame assembled with each other to form the inlet, the outlet and the first accommodation space, and wherein the inlet is disposed on the upper frame, the outlet and the base are disposed on the lower frame, and the second accommodation space is located at a lateral side of the lower frame.

9. The fan as claimed in claim 8, wherein the frame comprises a covering plate assembled with the lower frame to form the second accommodation space therebetween.

10. The fan as claimed in claim 8, wherein the upper frame comprises a guiding wall disposed at a periphery of the inlet, the impeller comprises a conical section shell, and the conical section shell, the upper frame and the guiding wall collectively form a backflow channel.

11. The fan as claimed in claim 10, wherein the backflow channel comprises an intake section, a horizontal section and an exhaust section, the intake section is formed between an outer wall surface of the conical section shell and an inner wall surface of the upper frame, the horizontal section is formed between a lower wall surface of the guiding wall and a top surface of the conical section shell, and the exhaust section is formed between the lower wall surface of the guiding wall and an inner wall surface of the conical section shell, and wherein during the fan is operating, a fourth airflow is formed to flow in the backflow channel from the intake section, flow through the horizontal section, and flow out through the exhaust section.

12. The fan as claimed in claim 11, wherein the conical section shell comprises a plurality of balance holes disposed on the top surface thereof, and the horizontal section is spatially corresponding to the plurality of balance holes.

13. The fan as claimed in claim 1, further comprising a label having at least one notch, wherein the label is attached to a bottom surface of the base, and the at least one notch is corresponding to at least one of the plurality of first through holes.

14. A fan, comprising:
a frame comprising an inlet, an outlet, a first accommodation space, a base and a second accommodation space, wherein the inlet and the outlet are disposed at opposite sides of the frame and in fluid communication with each other through the first accommodation space, and the first accommodation space is separated from the second accommodation space;
an impeller disposed in the first accommodation space and on the base; and
a driving assembly disposed between the base and the impeller; and
a circuit board disposed in the second accommodation space,
wherein the base comprises a plurality of first through holes, and the impeller comprises a plurality of second through holes;
wherein when the fan is operating, a first airflow is formed to flow from the inlet to the outlet, and a second airflow is formed to flow through the driving assembly via the plurality of first through holes and the plurality of second through holes; and
wherein a ratio of a distance between the plurality of second through holes and a top surface of the impeller to a height of the impeller is ranged from 0.2 to 0.6.

15. The fan as claimed in claim 14, wherein the driving assembly is an inner rotor motor comprising a bearing housing disposed on the base and a magnetic shell covered on the bearing housing, and wherein the magnetic shell comprises a plurality of third through holes corresponding to the plurality of second through holes, and the bearing housing comprises a plurality of fourth through holes corresponding to the plurality of second through holes.

16. The fan as claimed in claim 15, wherein the bearing housing and the base are integrally formed.

17. The fan as claimed in claim 14, wherein the driving assembly is an outer rotor motor comprising a magnetic shell, and the magnetic shell comprises a plurality of third through holes corresponding to the plurality of second through holes.

18. The fan as claimed in claim 14, wherein when the fan is in an environment without backpressure, the second airflow flows in from the plurality of first through holes and flows out through the plurality of second through holes.

19. The fan as claimed in claim 14, wherein when the fan is in an environment with backpressure, the second airflow flows in from the plurality of second through holes and flows out through the plurality of first through holes.

20. The fan as claimed in claim 14, wherein the second accommodation space comprises a first opening and a second opening, the first opening is disposed at a same side with the inlet and the second opening is disposed at a same side with the outlet, and wherein during the fan is operating, a third airflow is formed to flow in the second accommodation space from the second opening and flow out through the first opening.

21. The fan as claimed in claim 14, wherein the frame comprises an upper frame and a lower frame assembled with each other to form the inlet, the outlet and the first accommodation space, and wherein the inlet is disposed on the upper frame, the outlet and the base are disposed on the lower frame, and the second accommodation space is located at a lateral side of the lower frame.

22. The fan as claimed in claim 21, wherein the frame comprises a covering plate assembled with the lower frame to form the second accommodation space therebetween.

23. The fan as claimed in claim 14, further comprising a label having at least one notch, wherein the label is attached to a bottom surface of the base, and the at least one notch is corresponding to at least one of the plurality of first through holes.

* * * * *